(12) United States Patent
Bonner

(10) Patent No.: US 12,250,059 B1
(45) Date of Patent: Mar. 11, 2025

(54) SYSTEM AND METHOD FOR GEO/GSO OBJECT MAPPING AND MODELING

(71) Applicant: James Bonner, Broomall, PA (US)

(72) Inventor: James Bonner, Broomall, PA (US)

( * ) Notice: Subject to any disclaimer, the term of this patent is extended or adjusted under 35 U.S.C. 154(b) by 0 days.

(21) Appl. No.: 18/828,355

(22) Filed: Sep. 9, 2024

Related U.S. Application Data

(60) Provisional application No. 63/680,732, filed on Aug. 8, 2024.

(51) Int. Cl.
*H04B 7/185* (2006.01)
*B64G 1/24* (2006.01)

(52) U.S. Cl.
CPC ..... *H04B 7/18513* (2013.01); *H04B 7/18519* (2013.01); *B64G 1/242* (2013.01); *B64G 1/2425* (2023.08)

(58) Field of Classification Search
CPC ............ H04B 7/18513; H04B 7/18519; B64G 1/242; B64G 1/2425
See application file for complete search history.

(56) References Cited

U.S. PATENT DOCUMENTS

| | | | |
|---|---|---|---|
| 2002/0149514 A1* | 10/2002 | Fichter | G01S 19/05 342/357.25 |
| 2014/0138491 A1* | 5/2014 | Woo | B64G 1/2425 244/165 |
| 2014/0339368 A1* | 11/2014 | Majer | B64G 1/2425 244/158.6 |
| 2021/0403183 A1* | 12/2021 | Weiss | B64G 1/244 |
| 2023/0188203 A1* | 6/2023 | Hesar | H04B 7/18513 455/12.1 |
| 2024/0150045 A1* | 5/2024 | Stricklan | G06V 10/82 |

* cited by examiner

*Primary Examiner* — Raymond S Dean
(74) *Attorney, Agent, or Firm* — Slavitt IP Law, LLC

(57) ABSTRACT

A system and method for mapping and modeling objects in GEO (geosynchronous) class orbits using one or more mapping satellites in conjunction with a ground-based system that will effectively map objects, model object orbits, and provide real-time monitoring, alerts, and real-time data to satellite operators for collision avoidance and situational awareness.

16 Claims, 5 Drawing Sheets

SYSTEM AND METHOD FOR GEO/GSO OBJECT MAPPING AND MODELING

BACKGROUND OF THE INVENTION

As of May 1, 2023, the Union of Concerned Scientists Satellite Database listed 7,560 known satellites orbiting Earth. Of these, over 500 are listed in the database as being GEO class. GEO class satellites include satellites in GEO that may have variations in, apogee, perigee, eccentricity, inclination, and period from standard GEO. Most of the world relies on these satellites for global communications, GPS services, earth observation, science, weather, defense, direct-to-home TV services, and satellite radio to name a few.

Orbital space also contains considerable quantities of other objects. As described in SDA among different service providers: GEO perspective, Space Data Association, June 2024, there are more than 33,000 objects of a size greater than 1 cm in GEO class orbit, yet only approximately 4% of these objects are cataloged. These objects pose a significant threat to GEO class satellites due to possible collision. Collision with objects can damage and possibly disable a satellite or cause energetic fragmentation generating additional objects.

Valuation of the GEO class satellites in total, is the sum of replacement cost, loss of revenue, and cost of disruption of terrestrial services that rely on the satellite communication, and is estimated in hundreds of millions of dollars in addition to the impact on science, defense, and earth observation. The object field created by a collision incident could render GEO class orbit locations unusable and would increase the need for mapping in order to avoid future collision incidents. Due to the sensor cost, additional mass, additional power and ground modeling cost, it is prohibitive for individual satellite operators to perform object detection and tracking.

Satellites in GEO class orbit face the challenges of counteracting the perturbations caused by the earth, moon, and sun in maintaining continuous communication with the earth-based antennae. GEO class satellites must stay within a "North/South/East/West box" to maintain proper communications. Actions taken to maintain a GEO class satellite within that designated box are referred to as North/South station-keeping (NSSK) and East/West station-keeping (EWSK). These actions require the satellite to engage thrusters which uses the limited supply of on-board propellant. This propellant accounts for a significant part of a satellite's on-orbit mass.

GEO is a dynamic environment. New object fields may be created by satellite or launch vehicle body energetic fragmentation or passivation, meteors, and any other unsuspected event that threaten GEO satellites. Further, as recently as June of 2024, commercial GEO satellites have been interfered with by a Russian inspector satellite known as Luch 2. As a result, in order to avoid collisions with GEO class satellites, there is a need to effectively map and model GEO class objects.

SUMMARY OF THE INVENTION

The present invention is a system and method for creating a precision mapping model for GEO class objects that enables satellite operators to perform timely and fuel-efficient collision-avoidance maneuvers and provides real-time monitoring for situational awareness. The present invention is accomplished by deploying one or more mapping satellites into a GEO class orbit, each having one or more sensors for the detection and tracking of space objects, such as radar, LiDAR, or other sensors, and by exploiting the natural orbital perturbations that occur instead of counteracting these forces with the use of thrusters and propellant. By allowing the mapping satellite(s) to drift North and South (that is, by refraining from NSSK), over time, the mapping radius (inclination) of the toroid about the path of the mapping satellite is increased, different aspect angles of the objects are achieved resulting in greater accuracy to the objects mapping model, and the limited supply of on-board propellant is significantly preserved and depleted more slowly thereby extending the useful life of the satellite(s).

In addition to North/South drift, East/West drift may also be utilized by locating the mapping satellite in a slightly super-synchronous orbit, in a slightly sub-synchronous orbit, or in a GEO class orbit with imparted East/West thrust. Moreover, by utilizing East/West drift, GEO class objects may be mapped more efficiently and the modeling accuracy may be improved by mapping such objects at various aspect angles and by mapping objects that may not be as readily detected if the satellite were stationary about the longitudinal node (i.e., without East/West drift). In certain embodiments, the mapping satellite may be deployed in orbit at a fixed longitude. In certain embodiments, the mapping satellite may be deployed in orbit at an ever-increasing North/South drift.

The system and method of the present invention thus provides real-time monitoring of the GEO class object environment and situational awareness for satellite operators. As a result, collision avoidance maneuvers can be planned and executed in a planned and efficient manner.

DETAILED DESCRIPTION OF PREFERRED EMBODIMENTS

In one aspect of the invention, there is provided a system for mapping GEO class objects comprising one or more sensor-equipped mapping satellites positioned in a GEO class orbit, configured to detect and track GEO class objects, and a ground-based station in communication with the one or more mapping satellites configured to map GEO class objects, create a model of the orbits of such objects, and provide real-time monitoring of such objects. By not correcting for North/South drift, and/or by selecting orbits associated with East/West drift, the system requires minimal on-orbit propellant usage and creates both a larger and more accurate model of GEO class objects as the mapping satellites are able to view such objects from different aspect angles on different orbital passes. Such models are particularly useful for alerting satellite operators of potential collisions for the purpose of collision avoidance.

In another aspect of the invention, there is provided a method for mapping and modeling GEO class objects comprising the steps of gathering data regarding the position, bearing, and speed of GEO class objects with one or more sensor-equipped GEO class mapping satellites for which NSSK and/or EWSK is not maintained, and generating a mapping model of such objects using such data. By not correcting for North/South drift, and/or by selecting orbits associated with East/West drift, the method requires the use of minimal on-orbit propellant usage and results in both a larger and more accurate model of GEO class objects as the mapping satellites are able to view such objects from different aspect angles on different orbital passes. Such models are particularly useful for alerts to satellite operators for the purpose of collision avoidance.

Figure 1:
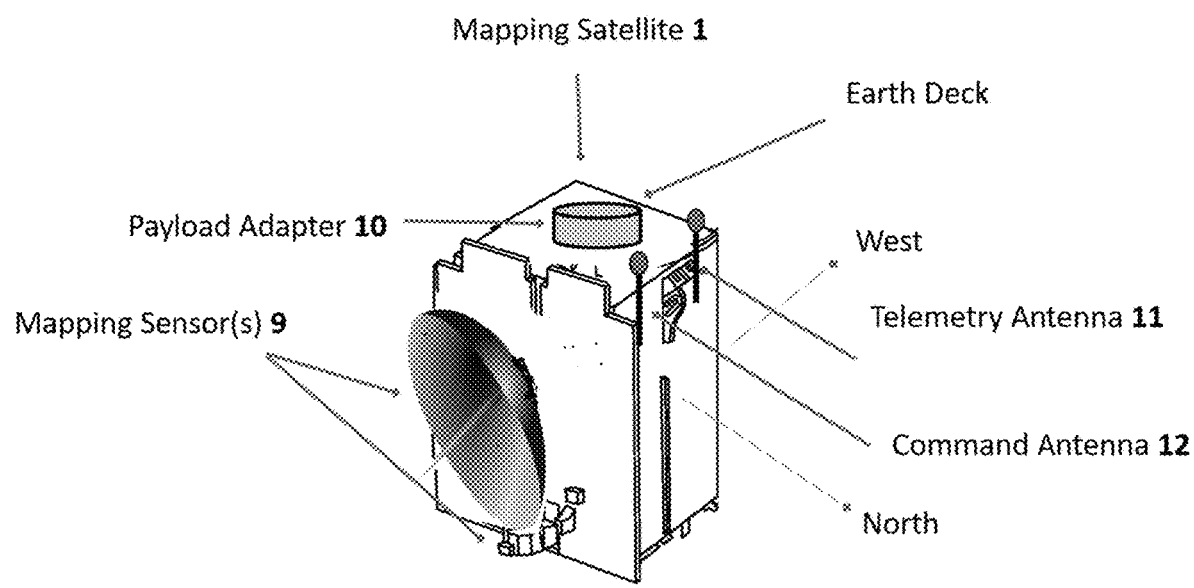
FIG. 1 illustrates an exemplary mapping satellite main body (solar arrays not shown) of the present invention.

FIG. 1 illustrates the main body of an exemplary mapping satellite 1 of the present invention. The mapping satellite 1 may be provided with a command antenna 12 and a telemetry antenna 11 for communication with one or more ground control stations 3. The mapping satellite 1 may also be provided with one or more sensors 9 for detecting and tracking objects.

Sensors 9 may be placed in various locations on the mapping satellite. Preferably, sensors 9 are located on the East-facing and West-facing sides of the satellite so that they are aligned to the direction of travel. Real-time coverage is a function of the sensor capabilities. By placing sensors 9 in an East/West attitude, the range of visibility is doubled. Additional sensors may be placed on the satellite to provide redundancy in case of a sensor failure. Sensors 9 may utilize radar or LiDAR, or other sensors to detect GEO class objects at various distances. As additional mapping satellites are added to the system, greater accuracy and real-time visibility to cover the 360° GEO orbit can be achieved.

Typically, GEO class satellites utilize the earth-facing side (earth deck) of the satellite for communications antennae. Placement of sensors 9 on the East/West-facing sides provides the option of a payload adapter 10 positioned on the earth deck which may accommodate a satellite co-passenger (not shown). Providing the platform for the delivery of a co-passenger (i.e., a third-party payload) can reduce launch costs by as much as 50%.

While not shown in FIG. 1, the mapping satellite 1 may also be provided with one or more computers, batteries, solar arrays, sensor signal processing, additional sensors used to determine the satellite's location and attitude, as well as propulsion thrusters used for orbit and attitude control, propulsion fuel, and one or more tanks for holding the propulsion fuel.

Figure 2:
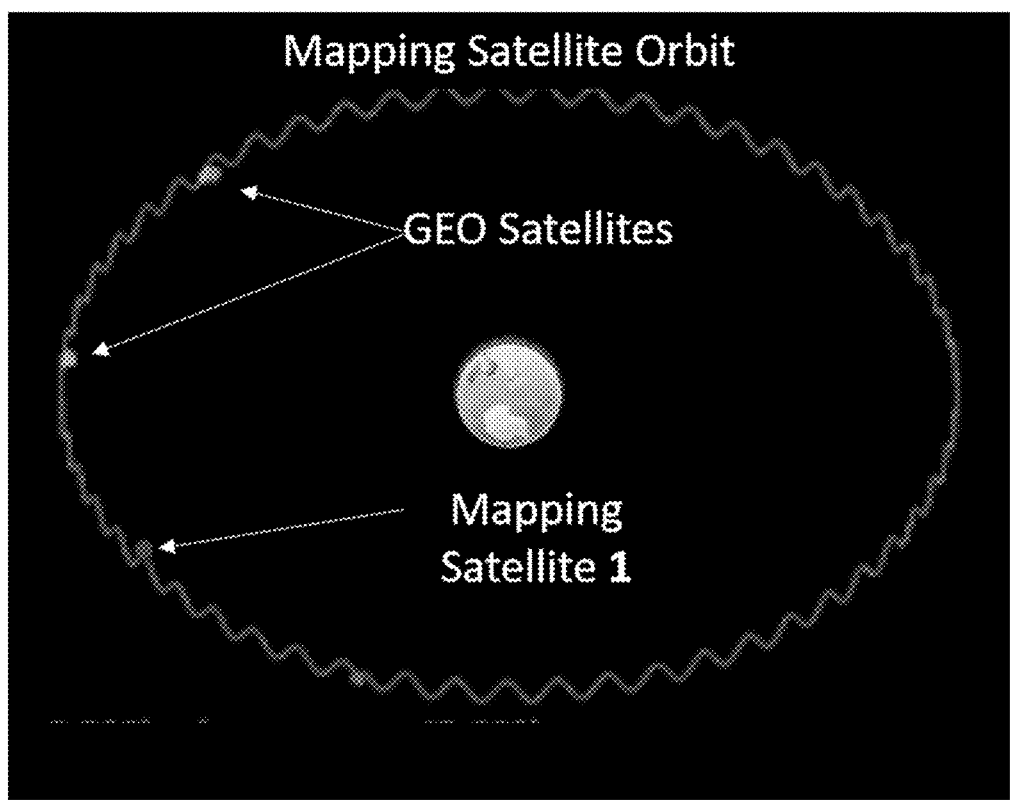
FIG. 2 illustrates an exemplary orbital path of a mapping satellite of the present invention.

FIG. 2 illustrates an exemplary orbital path of a mapping satellite of the present invention. The mapping satellite may be located in a slightly super-synchronous orbit in order to achieve westward drift, or a slightly sub-synchronous orbit in order to achieve eastward drift, or a GEO orbit in order to avoid East/West drift. In embodiments in which the mapping satellite is deployed at a GEO orbit, East/West drift may still be achieved by use of the propulsion thrusters to impart East/West earth-relative drift.

In certain embodiments, the mapping satellite is placed in an orbital path in which the amplitude of the North/South orbital drift increases over time. In one such embodiment, the amplitude of the North/South orbit drift may increase at a rate of about 0.8 deg/year.

As shown in FIG. 2, with neither NSSK nor EWSK being performed, the resulting orbit of the mapping satellite is a sinusoidal pattern about the GEO reference mapping orbit, with the amplitude of the sinusoidal form (inclination) increasing over time. The mapping satellite shown in FIG. 2 is also shown in GEO orbit with a thruster-imparted westward drift as well.

The mapping satellite may be repositioned, defined as any change in the satellite orbital parameters (apogee, perigee, eccentricity, drift rate, inclination, and period). As a result of the lack of NSSK, and allowing the mapping satellite to engage in East/West drift, on-orbit propellant is conserved which provides more propellant for longer on-orbit life and/or repositioning, The satellite may be repositioned by ground command.

An additional consequence of not performing NSSK is that the requirement for on-orbit propellant is greatly reduced, thereby reducing satellite size, mass, and potentially launch cost. A further consequence of not performing NSSK is a broader mapping toroid about the reference mapping orbit, and a higher accuracy model than a static GEO class object detection satellite, without repositioning, that provides variant aspect angles on objects to better enhance model accuracy. Moreover, model accuracy increases over time as the mapping satellite traces through a given region of the mapped toroid at different North/South points along the cross-section of the toroid with each orbit.

Figure 3:
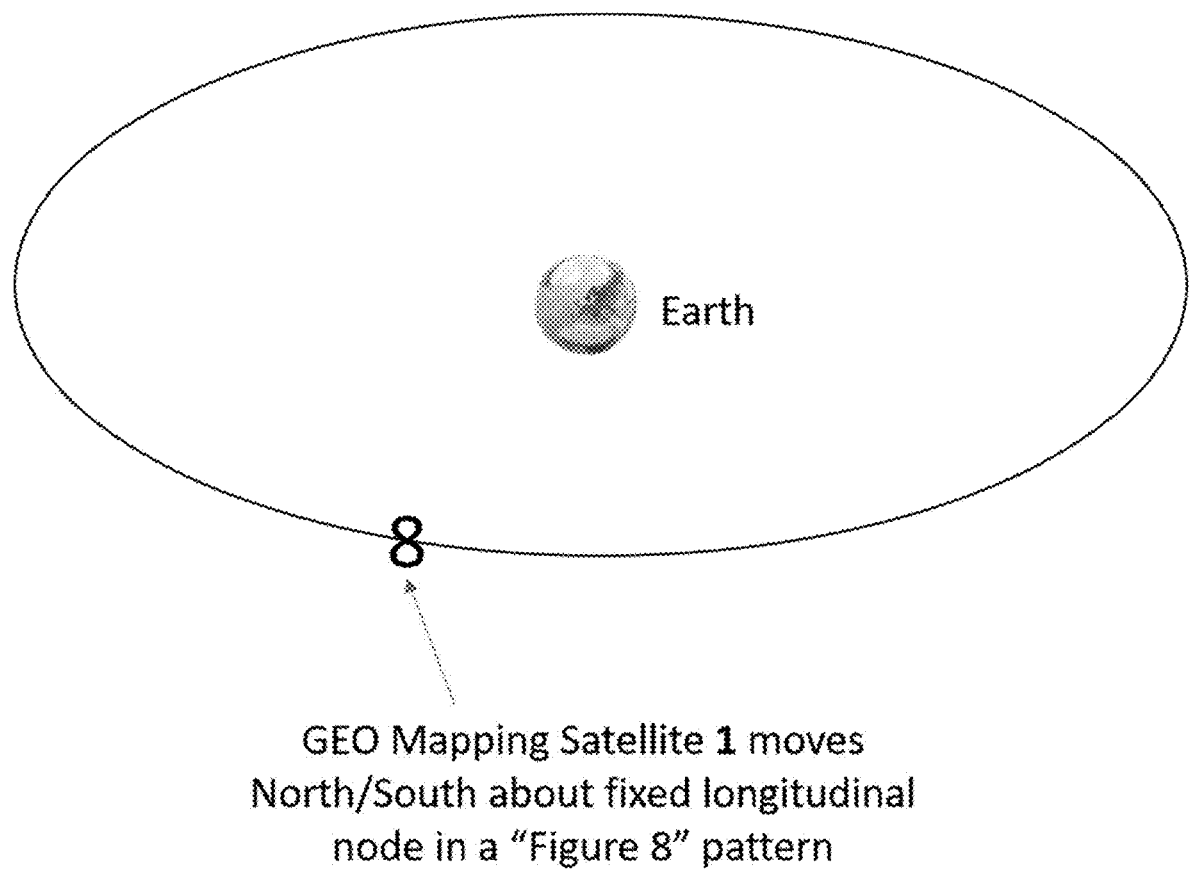
FIG. 3 illustrates another exemplary orbital path of a mapping satellite of the present invention.

FIG. 3 illustrates another exemplary orbital path of a mapping satellite of the present invention. In this embodiment, the mapping satellite is located in a GEO orbit with no East/West drift (i.e., having a fixed longitudinal node). The mapping satellite does not perform NSSK. The resulting orbit is a "FIG. 8" pattern about the GEO reference mapping orbit longitudinal node.

In certain embodiments, the mapping satellite is placed in an orbital path in which the amplitude of the orbit increases over time. In one such embodiment, the amplitude of the orbit may increase at a rate of about 0.8 deg/year in the North/South plane. As a result of the lack of NSSK, on-orbit propellant is conserved which provides more propellant for additional on-orbit life and/or repositioning. As in the example shown in FIG. 2, a further consequence of not performing NSSK is a broader mapping toroid about the reference orbit, and a higher accuracy model than a static GEO object detection satellite, without repositioning, that provides variant aspect angles on objects to better enhance model accuracy. Moreover, model accuracy increases over time as the mapping satellite traces through a given cross-section of the mapped toroid at different North/South points along the cross-section of the toroid with each orbit.

Figure 4:
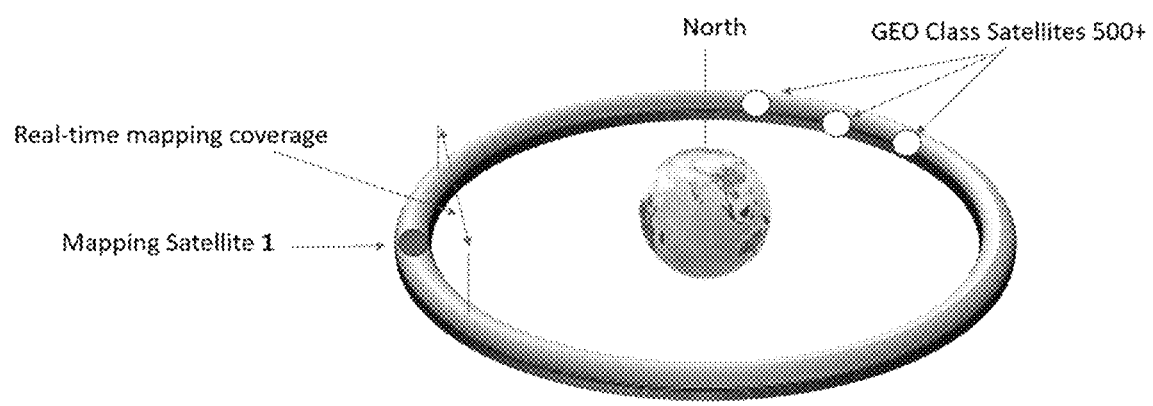
FIG. 4 illustrates an exemplary mapping coverage of the present invention.

FIG. 4 illustrates an exemplary mapping coverage developed over time. The real-time coverage, dependent on sensor capabilities, is illustrated. As additional mapping satellites are added to the system, greater accuracy and real-time visibility to cover the 360° GEO orbit can be achieved.

Figure 5:
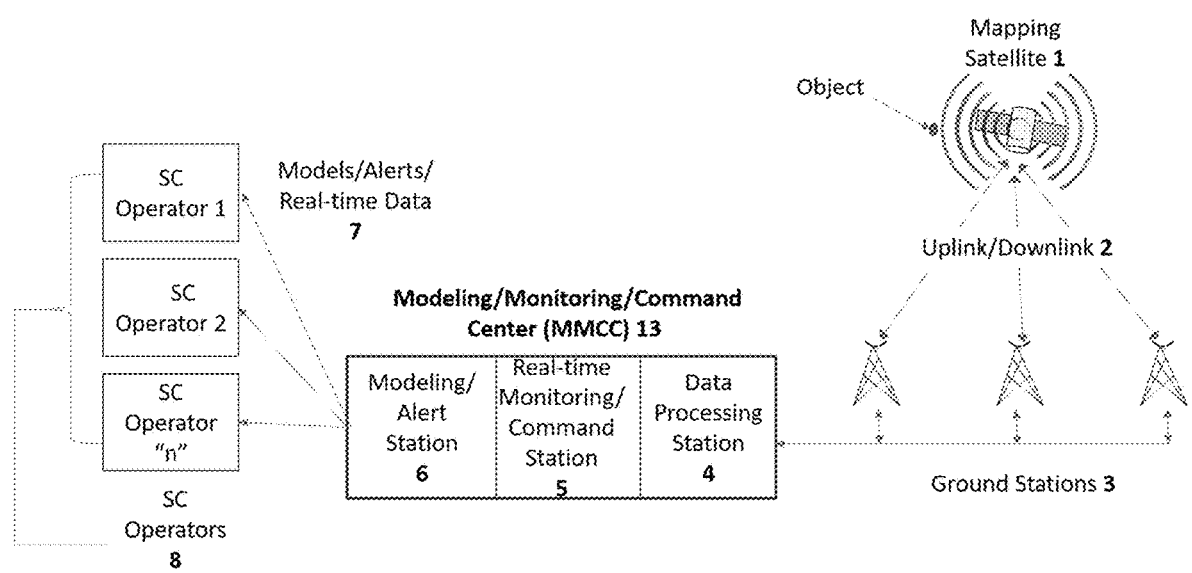
FIG. 5 illustrates an exemplary configuration of components of the mapping system of the present invention.

FIG. 5 illustrates an exemplary objects mapping, modeling, and monitoring system. In this embodiment, the system comprises a mapping satellite 1 and at least one ground station 3. While one ground station may be used for mapping satellites not utilizing East/West drift, at least three ground stations are preferred to provide continuous tracking of and communication with mapping satellites engaged in East/West drift. Commercial and secure USG ground stations are strategically located to provide global coverage.

Commercial ground stations provide tracking and communication services for satellite operators. As shown in FIG. 5, commands for orbital control, collision avoidance, pointing, and satellite maintenance functions are sent from real-time monitoring command station 5 located in mapping/monitoring control center (MMCC) 13 to ground station 3 preferably through an internet connection via a private network (PN) or virtual private network (VPN) in order to reduce latency. Ground station 3 transmits the commands via communications link 2 which are received by mapping satellite 1 via command antenna 12. Satellite telemetry health, status, and operational data are sent from mapping satellite 1 via telemetry antenna 11 over communications link 2 and received by ground station 3. Telemetry data is transmitted from ground station 3 to MMCC 13, preferably through an internet connection via a private network (PN) or virtual private network (VPN) in order to reduce latency.

Mapping satellite 1 collects object tracking data with sensors 9 and transmits such data to ground station 3 which sends the data to data processing station 4 located in MMCC 13. Data processing station 4 incorporates the object tracking data, determines object orbital parameters (e.g., size, position, and velocity), and sends the orbital parameters to the real-time monitoring command station 5 and to modeling/alert station 6. Mapping satellite real-time monitoring foe collision-avoidance and situational awareness is performed in the real-time monitoring command station 5. Mapping model creation/updates, conjunction risk assessment and collision avoidance alert generation (conjunction data message (CDM)) are performed in modeling/alert station 6. Existing ground-based modeling software used for GEO class orbit mapping may be adapted to create/update these models or advanced AI software may be used. Models, model updates, collision avoidance alerts, and real-time data (collectively, 7) may be sent to satellite operators 8 for collision avoidance maneuvers, and for situational awareness.

Due to the unique orbits of the mapping satellites, additional payloads may be accommodated to perform communications, earth observation, technology demonstration, intelligence, or defense-related services.

I claim:

1. A system for mapping and modeling GEO (geosynchronous) class objects, comprising:
   a mapping satellite placed in a GEO class orbit in which North/South station-keeping is not maintained, wherein the mapping satellite is equipped with at least one sensor for gathering data regarding the position, bearing, and speed of GEO class objects; and
   a ground station in communication with the mapping satellite, wherein the ground station uses the object data to create mapping models of the GEO class objects.

2. The system of claim 1, wherein the amplitude of North/South orbital drift increases over time.

3. The system of claim 1, wherein the mapping satellite is placed in a GEO class orbit in which East/West station-keeping is also not maintained, and further comprises at least two additional ground stations positioned in different locations around the earth to maintain continuous communication with the mapping satellite as it engages in East/West orbital drift.

4. The system of claim 1, wherein the mapping satellite is equipped with at least two sensors wherein such sensors are positioned on the East-facing and West-facing sides of the mapping satellite.

5. The system of claim 1, wherein the sensors utilize radar, LiDAR, or a combination of radar and LiDAR.

6. The system of claim 1 further comprising one or more additional mapping satellites placed in geosynchronous or geostationary orbits in which North/South station-keeping is not maintained, wherein the one or more mapping satellites are each equipped with at least one sensor for gathering telemetry data regarding the position, bearing, and speed of GEO class objects.

7. The system of claim 6, wherein the additional mapping satellites are each equipped with at least two sensors wherein such sensors are positioned on the East-facing and West-facing sides of the one or more additional mapping satellites.

8. The system of claim 6, wherein the additional mapping satellites are positioned relative to each other so as to provide continuous real-time coverage of mapped GEO class objects.

9. A method for mapping and modeling GEO class objects, comprising the steps of:
   gathering data regarding the size, position, bearing, and speed of GEO class objects with a mapping satellite placed in a GEO class orbit in which North/South station-keeping is not maintained, wherein the mapping satellite is equipped with at least one sensor;
   transmitting the data from the mapping satellite to a ground station; and
   using the data to create a mapping model of the GEO class objects.

10. The method of claim 9, wherein the amplitude of North/South orbital drift increases over time.

11. The method of claim 9, wherein the mapping satellite is placed in a GEO class orbit in which East/West station-keeping is also not maintained.

12. The method of claim 9, wherein the mapping satellite is equipped with at least two sensors wherein such sensors are positioned on the East-facing and West-facing sides of the mapping satellite.

13. The method of claim 9, wherein the sensors utilize radar, LiDAR, or a combination of radar and LiDAR.

14. The method of claim 9 further comprising one or more additional mapping satellites placed in GEO class orbits in which North/South station-keeping is not maintained, wherein the one or more mapping satellites are each equipped with at least one sensor for gathering data regarding the size, position, bearing, and speed of GEO class objects.

15. The method of claim 14, wherein the additional mapping satellites are each equipped with at least two sensors wherein such sensors are positioned on the East-facing and West-facing sides of the additional mapping satellite.

16. The method of claim 14, wherein the additional mapping satellites are positioned relative to each other so as to provide continuous real-time coverage of mapped GEO class objects.

* * * * *